May 15, 1934.  G. M. CROSS  1,959,199
SCROLL SAW
Filed Jan. 5, 1933
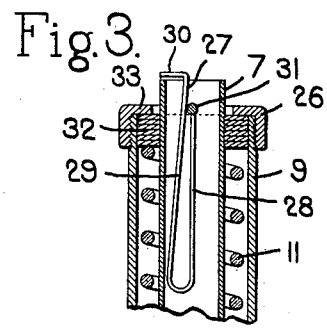
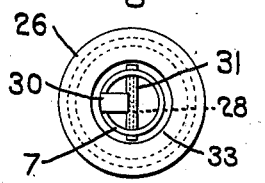
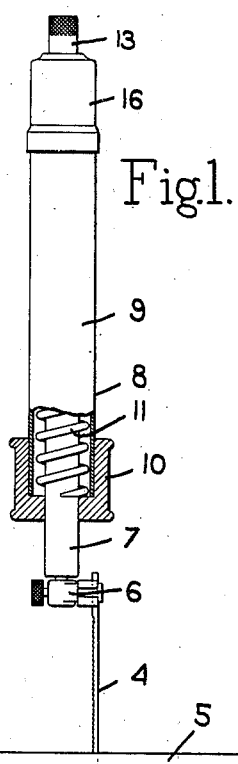
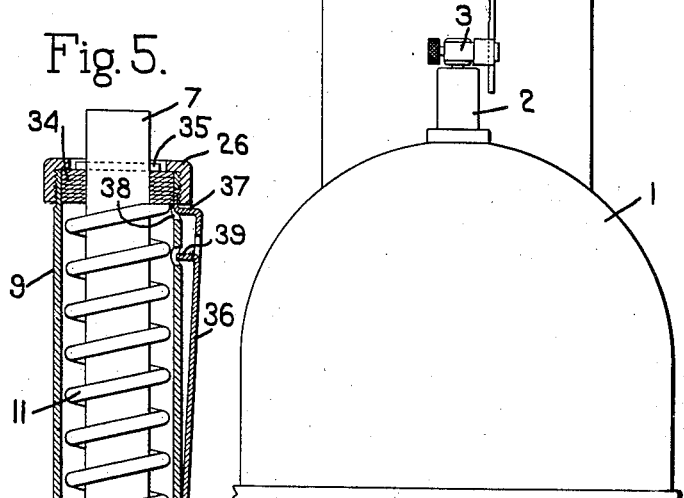
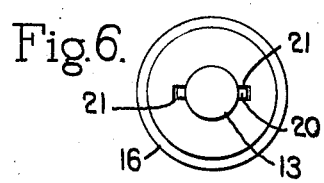
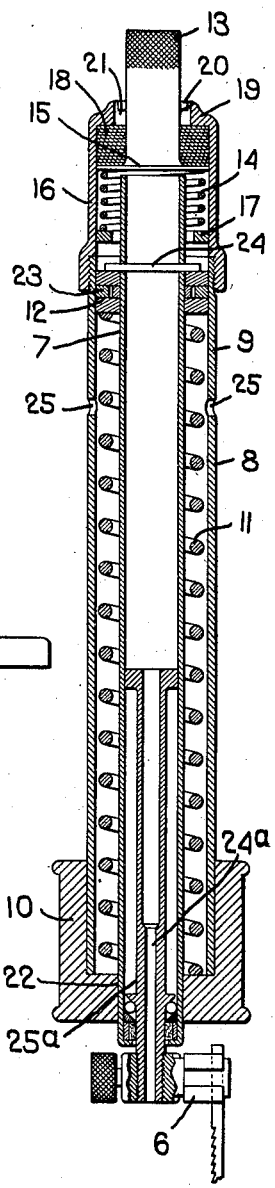
Inventor.
Grosvenor M. Cross
by Heard Smith & Tennant
Attys.

Patented May 15, 1934

1,959,199

UNITED STATES PATENT OFFICE 1,959,199

SCROLL SAW

Grosvenor M. Cross, Brookline, Mass.

Application January 5, 1933, Serial No. 650,223

8 Claims. (Cl. 143—73)

This invention relates to improvements in scroll saws and has for its general object to increase the operating efficiency of the saw.

A particular object of the invention is to provide in a scroll saw means for releasing the tension in the saw blade and for locking the saw blade tensioning device in saw blade tension-releasing position, thereby permitting ready removal and replacement of saw blades.

The object of the invention is further to provide means for automatically unlocking the saw blade tension releasing means upon movement of the saw blade in the saw blade tension-applying direction.

The object of the invention is further to provide a cushioning means to eliminate the destructive effect of the rapid movement of the spring-acutated or saw blade tensioning member when a saw blade breaks or the saw blade securing means accidentally becomes loosened.

The object of the invention is further to provide an air-pumping device for removing sawdust from the sawing point, such device being operated by the reciprocation of the saw blade tensioning member.

The object of the invention is further to provide an air pumping device for removing sawdust which utilizes the guiding means in connection with the saw blade tensioning device as a piston which reciprocates within the fixed guiding means in which the saw blade tensioning device or member moves.

Other objects and features will more fully appear from the following description in connection with the accompanying drawing and will be particularly pointed out in the claims.

In the drawing:

Fig. 1 is a side elevation of a scroll saw embodying the invention with certain of its parts being shown in cross section.

Fig. 2 is an enlarged vertical section of the saw blade tensioning mechanism.

Fig. 3 is a detailed section showing a modification of the saw blade tensioning mechanism shown in Fig. 2.

Fig. 4 is a top plan view of the elements shown in Fig. 3.

Fig. 5 is a detailed sectional view of a further modification of the saw blade tension-releasing mechanism.

Fig. 6 is a top plan view of Fig. 5.

The features of the present invention may be applied to any type of scroll saw. For illustrative purposes, the present invention is described in connection with a well-known type of scroll saw. The scroll saw disclosed herein is similar to that described in my co-pending application for a scroll saw, Serial No. 631,183, filed August 31, 1932, and comprises a saw blade reciprocating mechanism, a portion of which is enclosed within a housing 1. The saw blade reciprocating mechanism includes a vertically reciprocating saw blade actuating member 2 which is provided with a clamp 3 or other means for detachably securing one end of the saw blade 4. The saw blade reciprocates through the usual work table 5. A clamp 6 or other saw blade securing means receives the other end of the saw blade. The clamp 6 is situated upon the lower extremity of a saw blade tensioning member 7 which is vertically slidable in a fixed guide member 8. The guide member 8 is desirably secured in the end of a rigid horizontal supporting arm or horn, not shown. The guide 8 desirably comprises a tube 9 secured in a base portion 10.

The saw blade tensioning member 7 is urged upwardly by a spring 11. The spring 11, therefore, exerts a tension upon the saw blade. The saw blade tensioning member 7 is desirably hollow or tubular to reduce its moment of inertia.

As the member 2 of the saw blade reciprocating mechanism is driven, its power is transmitted through the saw blade to the saw blade tensioning member 7. The upper end of the spring 11 bears against a combined guide and piston 12, the complete function of which will be hereinafter more fully described. The spring 11 bears at its lower end upon the base member 10. Upon downward movement of the member 7, therefore, the spring 11 is compressed and upon the upward movement of the member 7 the spring 11 expands, and in doing so maintains the tension in the saw blade 4. Sufficient tension is introduced in the spring 11 to maintain the desired tension in the saw blade at all points throughout its stroke.

To insert a saw blade in its clamping means, the saw blade tensioning member 7 must be manually pressed downwardly. It becomes an awkward procedure to hold down the member 7 and at the same time manipulate the saw blade clamps. To facilitate this operation, applicant has devised a means for depressing the member 7 and locking it in its depressed position while the saw blades are introduced in their clamps. The two hands of the operator are therefore at this time free to insert the blade in its clamps.

A desirable means for accomplishing this end comprises a plunger 13 which is vertically reciprocable and axially rotatable in the upper end of the tube 9. The plunger 13 is desirably maintained resiliently in its uppermost position under normal running conditions by means of a coiled spring 14 which bears at its upper end against a flange 15 at the base of the plunger 13. The plunger and its associated parts may be within the upper end of the tube 9 or they may desirably be mounted within a removable cap member 16 devised especially to receive the plunger. The cap 16 is provided with screw threads at its lower end complementary to the threads ordinarily provided at the upper end of the guide tube 8 of this type of scroll saw. The plunger unit may therefore be readily attached to existing equipment.

The lower end of the spring 14 is supported by a peripheral flange 17 within the cap 16. The upper face of the flange 15 on the plunger bears against a resilient gasket 18 which may be made of a plurality of layers of rubber or any other desirable resilient material. The upper layer of the gasket 18 engages an inwardly turned flange 19 at the upper end of the cap 16. The object and function of the gasket 18 will hereinafter be more fully described.

To release the tension in the saw blade, it is positioned at or near the upper part of its stroke and the plunger 13 is depressed, at which time the flange 15 engages the upper end of the member 7 and causes it to move downwardly, thereby relieving the tension in the saw blade 4. The plunger 13 is desirably provided with a knurled surface at its upper end by means of which it may be axially rotated. To lock the plunger 13 in its downward position, a pin 20 extends laterally through the plunger and projects a short distance outwardly at diametrically opposite points. The projections of the pin 20 are received by slots 21 in the flange 19 of the cap member 16. The plunger 13 is rotated after having been depressed to a point where the pin 20 is below the flange 19, thereby causing the projections of the pin 20 to engage the flange 19 and prevent its return to normal position. The saw blade may now readily be secured in its clamps and thereafter the plunger 13 is rotated until the projections of the pin 20 enter the slots 21, at which time it will return to its uppermost position out of engagement with the member 7.

It is usual in this type of scroll saw to provide a guide bearing 22 in the base portion of the guide member 8 to guide the lower end of the member 7. The upper end of the member 7 is guided by means of a piston-like guiding flange which engages the inner walls of the tube 9 and reciprocates therein. The piston-like flange is herein of special construction, as shown at 12, and is utilized as a piston within the tube 9 to pump a blast of air toward or adjacent the sawing point upon the upper face of the work.

The combined guide and piston member 12 may be of any suitable construction to form a reasonably tight piston within the tube 9. If desired, a special gasket or piston ring 23 may be introduced in the periphery thereof. The member 12 is held against movement upon the member 7 by means of a transverse pin 24. The member 12 is held firmly against the pin 24 by reason of the tension in the spring 11. The piston member 12, as it is reciprocated by the movement of the member 7, compresses air in the upper end of the tube 9 and the cap 16 upon its upward stroke. The spring 14 and the flange 15 upon the plunger 13 constitutes a closure for the end of the cap 16. The air compressed by the member 12 is therefore forced downwardly through the center of the hollow member 7 and through an air port 24a formed within the stem of a rotatable saw blade supporting member 25a, the construction of which is described in detail in the aforementioned co-pending application. The air passing downwardly through the member 7 may, however, be conducted to the upper face of the work near the sawing point by any other desirable means, such, for example, as an external tube and a nozzle for directing the air blast to the sawing point. Upon the downward stroke of the member 7 the piston 12 tends to create a partial vacuum within the upper end of the tube 9. This partial vacuum, however, is restored to atmospheric pressure when the piston 12 in its downward movement passes the ports 25 in the tube 9 and upon the succeeding upward stroke of the piston 12 the air is again forced downwardly to the sawing point.

In the construction of the usual scroll saw, no adequate provision is made to cushion the rapid movement upwardly of the saw blade tensioning member 7 when the saw blade breaks or when the saw blade clamping devices accidentally become loosened. The present invention provides a cushioning means when such an emergency arises whereby the upward stroke of the saw blade tensioning member 7 when released accidentally is cushioned in order to prevent destruction of the guiding tube. Upon such upward movement of the member 7 its upper end engages the flange 15 of the plunger 13. The upward force of the impact is therefore transmitted to the resilient gasket 18, thereby eliminating its destructive effect.

A modification of the means for locking the saw blade tensioning member 7 in releasing position is shown in Figs. 3 and 4. In this construction the tube 9 is provided with the usual cap 26 through which the upper end of the member 7 passes extending for a short distance beyond the cap 26. Within the member 7 a locking member 27 is secured. The member 27 is provided with a wide portion 28 extending downwardly into the tube and of a width substantially equal to the internal diameter of the member 7. The member 27 is also provided with an upwardly extending spring arm 29, of substantially less width than the portion 28. The spring arm 29 projects upwardly and is provided with an outwardly turned lateral locking arm 30 which is normally held in a position overlying the upper edge of the member 7. The locking device 27 is held in the tube between this upper edge of the tube and a laterally extending pin 31. The pin 31 projects outwardly beyond the peripheral limit of the tube 7 and is engaged by a plurality of gaskets 32 which act as the upper guiding member for the saw blade tensioning member 7 within the tube 9. The upper end of the tensioning spring 11 engages the lower face of the gaskets 32. To operate the device the projecting end of the saw blade tensioning member 7 is pushed downwardly, thereby relieving the saw tension and the laterally extending locking arm 30 is pushed outwardly when the member 7 has been depressed to a point where the arm 30 will pass beneath the flange 33 of the cap 26, thereby locking the member 7 down in its saw blade tension-releasing position. After the saw blade has been adjusted and the machine started, the first downward saw blade tension-applying motion of the saw blade releases the upward force of the arm 30 against the flange 33, permitting the arm 30 to return to its normal position shown in Fig. 3, after which the machine resumes normal operation.

Fig. 5 illustrates a further modified form of the saw blade tension-releasing mechanism. The upper end of the tube 9 is provided with the usual cap 26 screw-threaded to the upper end thereof and through which the upper end of the saw blade tensioning member 7 extends. The upper end of the member 7 is provided with a guide 34 similar to the member 32 in Fig. 3. The member 34 is retained upon the member 7 by means of a lateral pin 35 extending a short distance outwardly over the upper face of the member 34. The member 34 is retained against the pin 35 by the tension within the spring 11. The locking device in this construction is secured to the outer pheriphery of the tube 9 and is composed of a resilient arm 36 riveted or otherwise secured at its lower end to the tube 9 and extending upwardly to a point a measured distance below the upper face of the member 34, such distance being equal to the proper amount that the member 7 should be depressed properly to relieve tension in the saw blade. The upper end of the member 36 is provided with a laterally inward extending arm 37 and is normally withheld from the path of the member 34 during the normal operation of the device. If desired, the inner end of the arm 37 may be upwardly turned to engage the inner face of the side walls of the cap 26 to limit the outward movement of the member 36. The arm 37 may be pushed inwardly through the wall of the tube 9 through the aperture 38 provided therefor. To lock the saw blade tensioning member 7 in its saw blade tension-releasing position, it is depressed by pressing its upward end downwardly until the top face of the member 34 is below a face of the arm 37, at which time the member 36 is pressed inwardly and the member 7 may then be released and is locked in its downward position by engagement with the arm 37. If it is desired to provide for saw blades of varying length, it may be necessary to depress the member 7 downwardly to a greater extent for a short blade than for a long blade. One or more additional laterally extending arms 39 may be provided which are situated below the arm 37 and function to lock the member 7 in its saw blade tension-releasing position when depressed to a point where the upper face of the member 34 is below the arm 39.

In this form also after the saw blade has been adjusted and the machine started, the first downward saw blade tension-applying motion of the saw blade releases the resilient arm 36 and it returns to its normal position and the machine resumes its normal operation.

All three forms of the invention illustrated and described therefore embody the broad features of the invention in which the saw blade tensioning member is locked in saw blade tension releasing position within the normal limits of its reciprocation, while those forms shown in Figs. 3 and 5 exemplify the additional feature of the unlocking of the saw blade tension-releasing means automatically upon movement of the saw blade in the saw blade tension-releasing direction.

Having thus described the invention, what is claimed as new, and desired to be secured by Letters Patent, is:

1. In a scroll saw, a work table, a saw blade, a driven saw blade reciprocating mechanism having means detachably to secure one end of said saw blade, a spring-actuated reciprocating saw blade tensioning member having means detachably to secure the other end of said saw blade, a fixed guide within which said saw blade tensioning member moves and means carried by one and co-acting with the other of the preceding two elements operable to lock said saw blade tensioning member in saw blade tension-releasing position within the normal limits of its reciprocation.

2. In a scroll saw, a work table, a saw blade, a driven saw blade reciprocating mechanism having means detachably to secure one end of said saw blade, a spring-actuated reciprocating saw blade tensioning member having means detachably to secure the other end of said saw blade, a fixed guide within which said saw blade tensioning member moves and means carried by one and co-acting with the other of the preceding two elements operable to lock said saw blade tensioning member in saw blade tension-releasing position within the normal limits of its reciprocation and to unlock it by a movement of the saw blade in the direction to apply tension.

3. In a scroll saw, a work table, a saw blade, a driven saw blade reciprocating mechanism having means detachably to secure one end of said saw blade, a spring-actuated reciprocating saw blade tensioning member having means detachably to secure the other end of said saw blade, a fixed guide within which said saw blade tensioning member moves, a plunger normally held out of the path of said saw blade tensioning member and operable when depressed to engage and move said saw blade tensioning member into saw blade tension-releasing position within the normal limits of its reciprocation, and means releasably to lock said plunger in depressed position.

4. In a scroll saw, a work table, a saw blade, a driven saw blade reciprocating mechanism having means detachably to secure one end of said saw blade, a spring-actuated reciprocating saw blade tensioning member having means detachably to secure the other end of said saw blade, a fixed guide within which said saw blade tensioning member moves, a resilient stop on said fixed guide acting to cushion the blow of the saw blade tensioning member when the saw blade breaks or becomes loose in said clamps.

5. In a scroll saw, a work table, a saw blade, a driven saw blade reciprocating mechanism having means detachably to secure one end of said saw blade, a spring-actuated reciprocating saw blade tensioning member having means detachably to secure the other end of said saw blade, a fixed guide tube within which said saw blade tensioning means moves, a piston within said tube reciprocated by said saw blade tensioning member, a plunger spring-pressed outwardly and projecting beyond the end of said tube, a head on the inner end of said plunger operable when the plunger is depressed to engage said saw blade tensioning member and release the tension in said saw blade, means releasably to lock said plunger in depressed position, a flange at the end of said tube, a resilient gasket between the head of said plunger and the flanged end of said tube, said gasket acting to cushion the blow of the saw blade tensioning member when the saw blade breaks and also to form an air-tight closure for the end of said tube, and an air passage from the chamber formed by the closed end portion of said tube and the piston leading through said saw blade tensioning member to a point adjacent the sawing point, whereby the reciprocation of said piston within said tube will cause a blast of air to remove sawdust from the work.

6. In a scroll saw, a work table, a driven saw blade reciprocating mechanism having means detachably to secure one end of said saw blade, a spring-actuated reciprocating saw blade tensioning member having means detachably to secure the other end of said saw blade, a fixed guide within which said saw blade tensioning member moves, and a spring-locking means secured to said guide having a laterally projecting shoulder operable to engage and lock said saw blade tensioning member in saw blade tension-releasing position within the normal limits of its reciprocation.

7. In a scroll saw, a work table, a driven saw blade reciprocating mechanism having means detachably to secure one end of said saw blade, a hollow spring-actuated reciprocating saw blade tensioning member having means detachably to secure the other end of said saw blade, a fixed guide within which said saw blade tensioning member moves, a spring-locking means secured within said hollow saw blade tensioning member having a laterally projecting shoulder operable to engage said fixed guide and lock said saw blade tensioning member in saw blade tension-releasing position within the normal limits of its reciprocation.

8. In a scroll saw, a work table, a saw blade, a driven saw blade reciprocating mechanism having means detachably to secure one end of said saw blade, a spring-actuated reciprocating saw blade tensioning member having means detachably to secure the other end of said saw blade and means operable to lock said saw blade tensioning member in either of a plurality of saw blade tension-releasing positions within the normal limits of its reciprocation.

GROSVENOR M. CROSS.